(12) United States Patent
Miyoshi

(10) Patent No.: US 7,995,484 B2
(45) Date of Patent: Aug. 9, 2011

(54) COMMUNICATION APPARATUS, COMMUNICATION STATE DETECTION METHOD AND COMMUNICATION STATE DETECTION PROGRAM

(75) Inventor: Ryuta Miyoshi, Tokyo (JP)

(73) Assignee: Sony Corporation, Tokyo (JP)

( * ) Notice: Subject to any disclaimer, the term of this patent is extended or adjusted under 35 U.S.C. 154(b) by 946 days.

(21) Appl. No.: 11/509,744

(22) Filed: Aug. 25, 2006

(65) Prior Publication Data

US 2007/0058552 A1    Mar. 15, 2007

(30) Foreign Application Priority Data

Sep. 12, 2005  (JP) .................. 2005-264258

(51) Int. Cl.
*G01R 31/08* (2006.01)
(52) U.S. Cl. ................. 370/242; 370/252
(58) Field of Classification Search .......... 370/242, 370/243, 244, 245, 252, 401
See application file for complete search history.

(56) References Cited

U.S. PATENT DOCUMENTS

| | | | | |
|---|---|---|---|---|
| 4,858,101 A | * | 8/1989 | Stewart et al. ............ | 700/2 |
| 6,996,502 B2 | * | 2/2006 | De La Cruz et al. ....... | 702/188 |
| 7,080,128 B2 | * | 7/2006 | Sakaguchi ................. | 709/213 |
| 7,206,804 B1 | * | 4/2007 | Deshpande et al. ........ | 709/203 |
| 7,386,610 B1 | * | 6/2008 | Vekiarides ................ | 709/224 |
| 7,519,072 B2 | * | 4/2009 | Nara et al. ................ | 370/401 |
| 2006/0015586 A1 | * | 1/2006 | Sharma et al. ............ | 709/220 |
| 2006/0085699 A1 | * | 4/2006 | Hathorn et al. ............ | 714/56 |
| 2006/0117195 A1 | * | 6/2006 | Niwa et al. ............... | 713/300 |

FOREIGN PATENT DOCUMENTS

| | | |
|---|---|---|
| JP | 6-75878 | 3/1994 |
| JP | 9-288633 | 11/1997 |
| JP | 11-95883 | 4/1999 |
| JP | 2002-82848 | 3/2002 |
| JP | 2003-115877 | 4/2003 |
| JP | 2004-295285 | 10/2004 |

\* cited by examiner

*Primary Examiner* — Ricky Ngo
*Assistant Examiner* — Christine Ng
(74) *Attorney, Agent, or Firm* — Oblon, Spivak, McClelland, Maier & Neustadt, L.L.P.

(57) ABSTRACT

A communication apparatus including a network controller configured to control communication connection to a different apparatus; and a main controller configured to control state detection of the network controller and data communication with the different apparatus connected to the communication apparatus through the network controller, wherein the main controller controlling the network controller to execute the state detection at predetermined intervals and repetitively transmit a state notification request to the different apparatus at the predetermined intervals and detect a communication disabled state with the different apparatus in response to a response to the state notification request from the different apparatus.

12 Claims, 8 Drawing Sheets

| IMAGE SELECTION |

COPY (2) ~ IMG_0224. jpg
2005/06/06   12:46:42            33/100
640×480        63KB COPY ~ COPY ~ IMG_0224. jpg
2005/06/06   12:46:42            34/100
640×480        63KB COPY ~ IMG_0224. jpg
2005/06/06   12:46:42            35/100
640×480        63KB COPY (2) ~ IMG_0203_2 (2). jpg
2005/06/06   12:46:42            36/100
640×480        63KB

STOP

5:36PM

CLOSE WITH (DETERMINATION)

COMMUNICATION APPARATUS, COMMUNICATION STATE DETECTION METHOD AND COMMUNICATION STATE DETECTION PROGRAM

CROSS REFERENCES TO RELATED APPLICATIONS

The present invention contains subject matter related to Japanese Patent Application JP 2005-264258 filed with the Japanese Patent Office on Sep. 12, 2005, the entire contents of which being incorporated herein by reference.

BACKGROUND OF THE INVENTION

1. Field of the Invention

This invention relates to a communication apparatus, a communication state detection method and a communication state detection program. More particularly, the present invention relates to a communication apparatus, a communication state detection method and a communication state detection program suitable for use to detect a communication sate between an audio apparatus, for example, of the mini component system type and a personal computer.

2. Description of the Related Art

A management method for a network connection which is applied to communication of various data of a personal computer or an electronic apparatus such as an AV (Audio Visual) apparatus through a network is known and disclosed, for example, in Japanese Patent Laid-open No. 2004-295285. According to the management method, various troubles which occur in such communication as described above are classified into two types which are detected separately from each other. One of the two types of troubles includes troubles which occur with an apparatus itself such as disconnection or failure of a LAN (Local Area Network) cable used for connection to another electronic apparatus or failure of a LAN board of the apparatus itself. The other of the two types of troubles includes troubles which occur outside an apparatus itself such as going down of a server as a destination of connection or traffic congestion. The two types of troubles are detected separately from each other, and a trouble of the apparatus itself is detected immediately without waiting for a timeout period of up to 75 to 80 seconds.

SUMMARY OF THE INVENTION

Incidentally, according to such a management method for a network connection as described above, a trouble of an apparatus itself can be detected immediately without waiting for a timeout period of up to 75 to 80 seconds. However, a trouble which occurs outside an apparatus itself and may possibly occur at any time such as going down of a server or the like as a connection destination or traffic congestion cannot be detected immediately. In particular, even if a data transfer request is sent to the server or the like, a waiting state of the apparatus itself continues on and on until a timeout period (75 to 80 seconds) set in advance elapses before data are acquired. Thus, within the period, the disabled state of communication between the apparatus itself and the server cannot be detected.

Therefore, it is desirable to provide a communication apparatus, a communication state detection method and a communication state detection program by which a communication state between network apparatus can be detected in a short period of time.

According to an embodiment of the present invention, there is provided a communication apparatus including a network controller and a main controller. The network controller configured to control communication connection to a different apparatus. The main controller configured to control state detection of the network controller and data communication with the different apparatus connected to the communication apparatus through the network controller. The main controller controls the network controller to execute the state detection at predetermined intervals and repetitively transmit a state notification request to the different apparatus at the predetermined intervals and detect a communication disabled state with the different apparatus in response to a response to the state notification request from the different apparatus.

In the communication apparatus, the main controller can perform state detection of the network controller. The main controller can also detect a communication disabled state between the network apparatus based on a response to the state notification request received from the different apparatus. Consequently, the communication state between the network apparatus can be detected in a short period of time without spending useless waiting time.

According to another embodiment of the present invention, there is provided a communication state detection method including the steps of repetitively executing a state detection and detecting a communication disabled state detection. The state detection step executes a state detection at predetermined intervals, state detection of a network controller configured to control communication connection to a different apparatus by means of a main controller configured to control state detection of the network controller and data communication with the different apparatus connected to the main controller through the network controller. The communication disabled state detection step detects with the different apparatus in response to a response to the state notification request from the different apparatus and controls the network controller together with the state detection step to transmit a state notification request to the different apparatus at predetermined intervals.

In the communication state detection method, the main controller can perform state detection of the network controller. The main controller can also detect a communication disabled state between the network apparatus based on a response to the state notification request received from the different apparatus. Consequently, the communication state between the network apparatus can be detected in a short period of time without spending useless waiting time.

According to a further embodiment of the present invention, there is provided a communication state detection program configured to cause a communication apparatus to execute the steps of executing a state detection and detecting a communication disabled state detection. The state detection step executes a state detection at predetermined intervals, state detection of a network controller configured to control communication connection to a different apparatus by means of a main controller configured to control state detection of the network controller and data communication with the different apparatus connected to the communication apparatus through the network controller. The communication disabled state detection step detects with the different apparatus in response to a response to the state notification request from the different apparatus and controls the network controller together with the state detection step to transmit a state notification request to the different apparatus at predetermined intervals.

According to the communication state detection program, the main controller can perform state detection of the network controller. The main controller can also detect a communication disabled state between the network apparatus based on a response to the state notification request received from the different apparatus. Consequently, the communication state between the network apparatus can be detected in a short period of time without spending useless waiting time.

In summary, with the communication apparatus, communication state detection method and communication state detection program, since the main controller can perform state detection of the network controller and can also detect a communication disabled state between the communication apparatus and the different apparatus based on a response to the state notification request received from the different apparatus. The communication state between the network apparatus can be detected in a short period of time without spending useless waiting time.

BRIEF DESCRIPTION OF THE DRAWINGS

FIG. 8 is a schematic view showing a normal state screen.

DETAILED DESCRIPTION OF THE PREFERRED EMBODIMENTS

Hereinafter, one embodiment of the present invention will be described with FIG. 1 to FIG. 8.

1. Outline of the Embodiments

Figure 1:
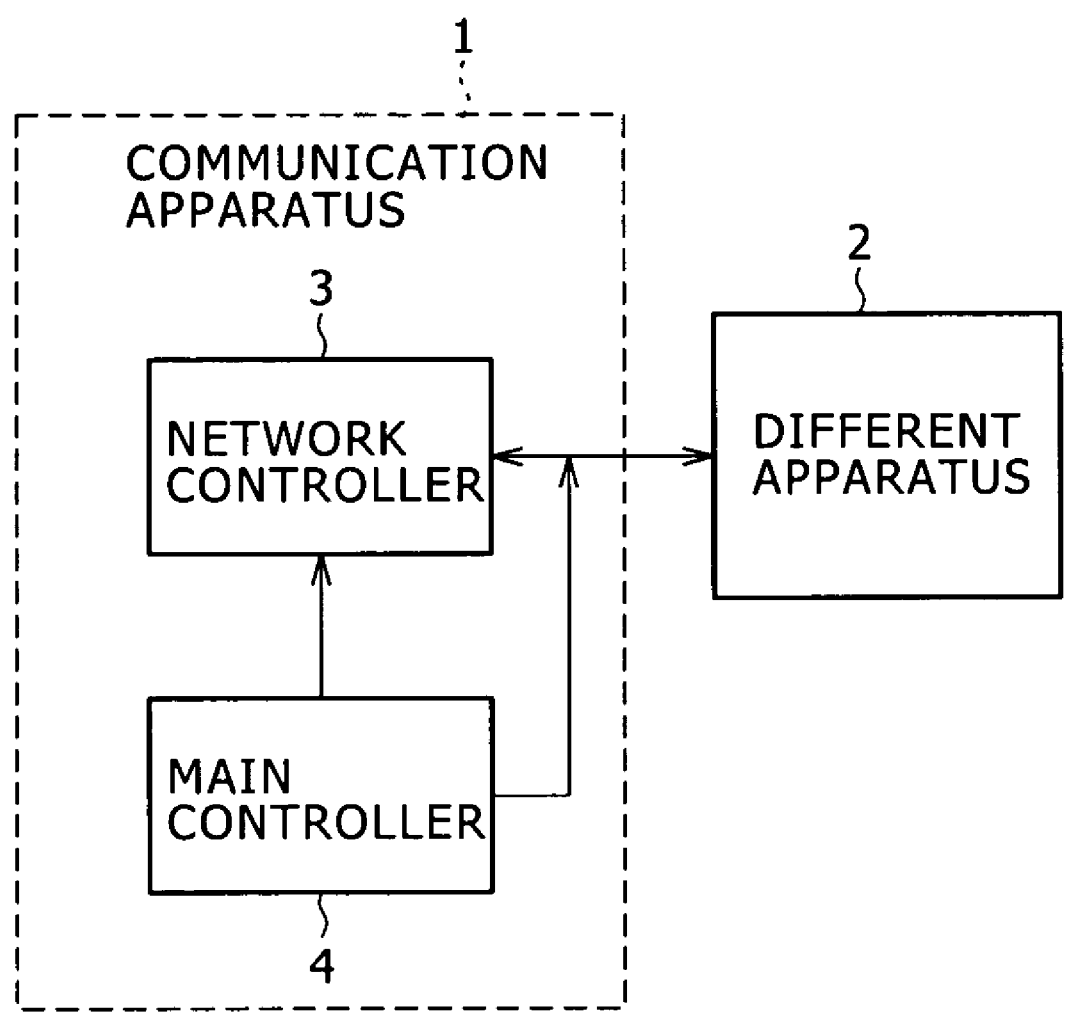
FIG. 1 is a schematic block diagram illustrating a concept of the present invention.
Figure 2:
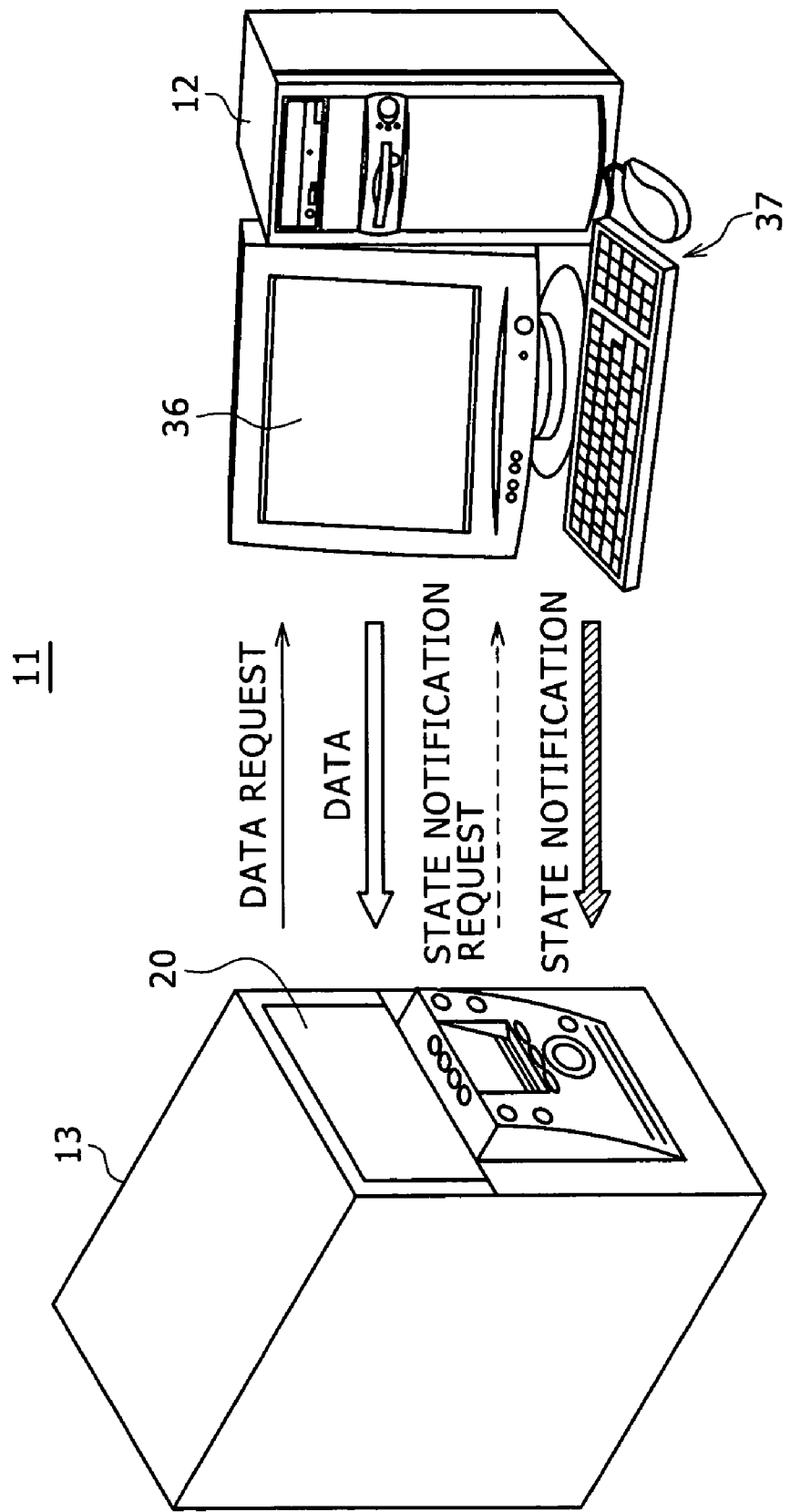
FIG. 2 is a schematic perspective view showing a general configuration of a network state detection system.

Referring first to FIG. 1, there is shown a hardware configuration by functional blocks of a communication apparatus 1 to describe a general concept of the present invention. The communication apparatus 1 is connected to a different apparatus 2 through a network.

The communication apparatus 1 includes a network controller 3 for controlling communication connection to the different apparatus 2. The communication apparatus 1 further includes a main controller 4 for detecting the state of the network controller 3 itself and controlling data communication with the different apparatus 2 connected to the different apparatus 2 through the network controller 3.

The main controller 4 executes the state detection of the network controller 3 at predetermined intervals. Further, the main controller 4 controls the network controller 3 so as to transmit a state notification request to the different apparatus 2 at the predetermined intervals and detect a communication disabled state with the different apparatus 2 in response to a response from the different apparatus 2 to the state notification request.

The main controller 4 can control the network controller 3 to perform transmission and reception of data to and from the different apparatus 2 separately from the transmission of the state notification request. Further, when the main controller 4 detects an abnormal response from the different apparatus 2 to the state notification request, it can control the network controller 3 so as to issue an error notification and stop the transmission and reception of data.

Furthermore, even while the transmission and reception of data stops, the main controller 4 controls the network controller 3 to transmit the state notification request at the predetermined intervals to the different apparatus 2. Then, if the main controller 4 detects a normal response again from the different apparatus 2, then it can control the network controller 3 so as to re-start the transmission and reception of data.

2. Particular Configuration of the Embodiment 2-1. General Configuration of the Network State Detection System Referring to FIG. 2, there is shown a general configuration of a network state detection system to which the present invention is applied. The network state detection system is generally denoted at 11 and includes a personal computer 12 and an audio apparatus 13 of the mini component system type. The personal computer 12 and the audio apparatus 13 are connected to each other by a network such as, for example, a wired LAN (Local Area Network) cable (not shown) so that they can communicate data with each other.

It is to be noted that the personal computer 12 and the audio apparatus 13 need not be connected to each other by a wire but may be connected to each other by radio using, for example, a Bluetooth module (registered trademark), an IEEE (Institute Of Electrical and Electronics Engineers) 802.11g module, or the like.

In the network state detection system 11, a data request, for example, for a thumbnail image or an actual image of the full size corresponding to the thumbnail is issued from the audio apparatus 13 to the personal computer 12. The personal computer 12 transmits data of the thumbnail image or the actual image to the audio apparatus 13 in accordance with the data request from the 13.

Further, in the network state detection system 11, the audio apparatus 13 issues a state notification request for the detection of a communication state with the personal computer 12 to the personal computer 12. Then, the audio apparatus 13 detects whether or not the communication state is a communication enabled state or a communication disabled state in response to a response from the network controller 3 and executes appropriate processes in accordance with the network state. Consequently, smooth and efficient action of the audio apparatus 13 can be assured.

2-2. Circuit Configuration of the Personal Computer

Figure 3:
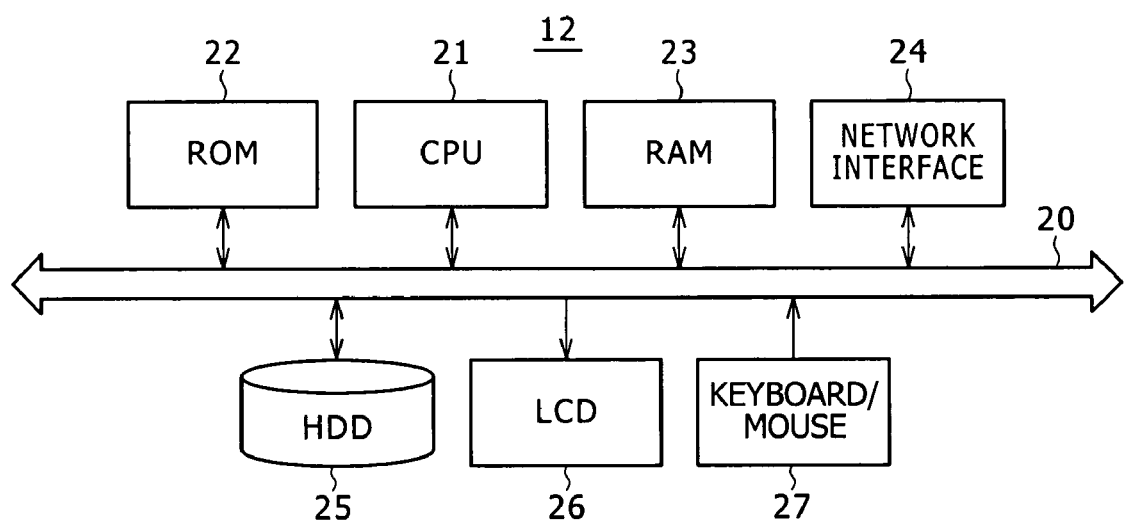
FIG. 3 is a schematic block diagram showing a circuit configuration of a personal computer.

Referring to FIG. 3, the personal computer 12 includes a CPU (Central Processing Unit) 21 connected to a bus 20 and controls the entire personal computer 12. In particular, the personal computer 12 executes various processes, which are executed by common personal computers, in accordance with a basic program and/or various application programs read out from a ROM (Read-Only Memory) 22 or a hard disk drive 25 and temporarily stored in a RAM (Random Access Memory) 33. Further, the personal computer 12 executes a predetermined process in accordance with an instruction inputted thereto through a keyboard/mouse 27 and controls an LCD (Liquid Crystal Display) unit 26 to display a result of the process and stores the result of the process into the hard disk drive 25 as occasion demands.

The personal computer 12 further includes a network interface 24 for establishing a connection to the audio apparatus 13 through a LAN cable so that it can communicate data with the audio apparatus 13 through the network interface 24.

2-3. Circuit Configuration of the Audio Apparatus

Figure 4:
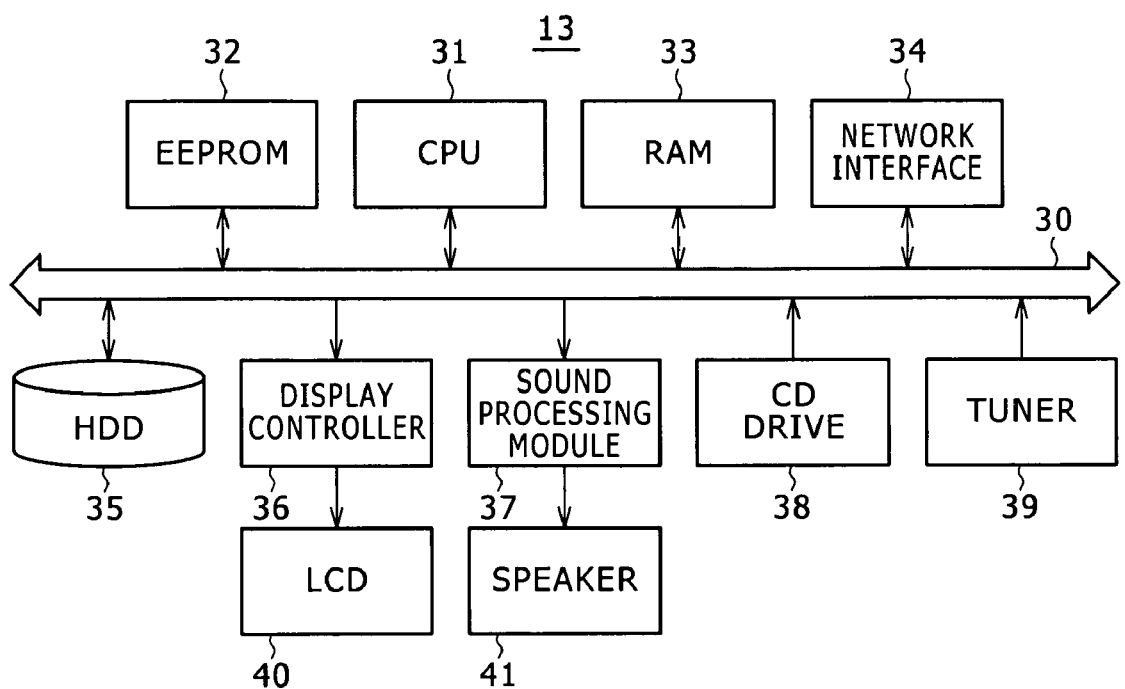
FIG. 4 is a schematic block diagram showing a circuit configuration of an audio apparatus.

Referring to FIG. 4, there is shown a circuit configuration of the audio apparatus 13. The audio apparatus 13 includes a CPU 31 connected to a bus 30 and controls the entire audio apparatus 13. In particular, the CPU 31 reads out a basic program and/or various application programs from an EEPROM (Electrically Erasable Programmable Read-Only Memory) 32 and temporarily stores the read out programs into a RAM 33. Further, the CPU 31 controls a CD (Compact Disc) drive 38 or a tuner 39 to execute a CD reproduction process or a radio reception process, respectively, which are executed by common audio apparatus, in accordance with the programs stored in the RAM 33. Then, the CPU 31 controls a sound processing module 37 to process reproduction sound from the CD or sound of a radio program so that the sound is outputted from a speaker 41.

Further, the CPU of the audio apparatus 13 temporarily stores CD reproduction data from the CD drive 38, content data received from the tuner 39, image data received from the personal computer 12 connected to LAN through a network interface 34, and compressed sound data of MP3 (MPEG Audio Layer-3) or like into the RAM 33. Then the CPU stores the data into a hard disk driver 35 and displays on an LCD unit 40, particularly display image data, through a display controller 36.

Further, the CPU 31 of the audio apparatus 13 reads out image data, content data or compressed sound data stored in the hard disk driver 35 in response to a reproduction instruction from the user so as to be outputted from the LCD unit 40 or the speaker 41.

In addition to the configuration described above, the CPU 31 of the audio apparatus 13 executes, when the personal computer 12 is mounted to the audio apparatus 13, a monitor thread for monitoring the communication state with the personal computer 12 other than an ordinary audio reproduction function in accordance with a communication state monitoring program. Such a monitoring process as just mentioned and an image acquisition process for acquiring image data from the personal computer 12 are described below.

Incidentally, the CPU 31 of the audio apparatus 13 corresponds to the main controller 4 of the communication apparatus 1 shown in FIG. 1, and the network interface 34 of the audio apparatus 13 corresponds to the network controller 3 of the communication apparatus 1 shown in FIG. 1.

2-4. Sequence of the Image Acquisition Process and the Monitoring Process

Here, a flow of processes performed between the audio apparatus 13 and the personal computer 12 until the communication state between the audio apparatus 13 and personal computer 12 is monitored and detected while an image acquisition process is performed is described. In the image acquisition process, data of a thumbnail image (hereinafter referred to as thumbnail image data) are acquired first, and then data of an actual image (hereinafter referred to actual image data) corresponding to the thumbnail image are acquired by the audio apparatus 13.

Figure 5:
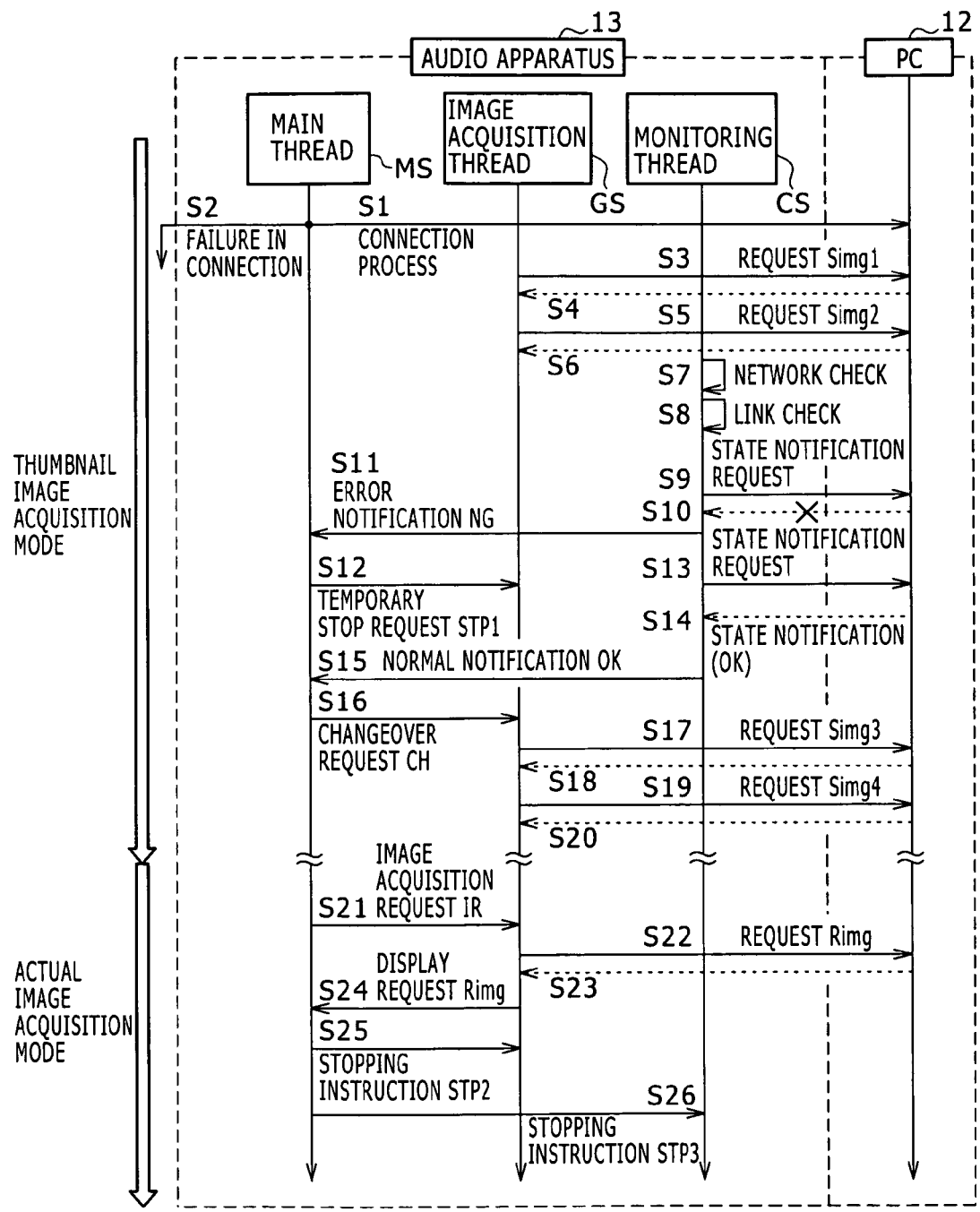
FIG. 5 is a schematic sequence chart illustrating a sequence of an image acquisition process and a monitoring process.

Referring to FIG. 5, there is shown a sequence of an image acquisition process and a monitoring process. The CPU 31 of the audio apparatus 13 executes an image acquisition thread GS for acquiring image data from the personal computer 12 and a monitoring thread CS for monitoring and detecting a communication state with the personal computer 12. The CPU 31 further executes a main thread MS for executing all of processes other than the image acquisition thread GS and the monitoring thread CS. In the following, description is given principally of the three threads mentioned.

In the main thread MS, the audio apparatus 13 first attempts to perform a connection process for starting communication with the personal computer 12 connected thereto by a LAN cable (step S1). If the attempt results in failure, then the audio apparatus 13 ends the processing without executing the image acquisition process and monitoring process sequence (step S2). On the other hand, if the attempt of the connection process results in success, then the image acquisition process of thumbnail image data is started in a thumbnail acquisition mode by the image acquisition thread GS. At the same time, the monitoring process for monitoring and detecting the communication state with the personal computer 12 is started by the monitoring thread CS.

It is to be noted that, while, in this instance, the image acquisition process of thumbnail image data by the image acquisition thread GS and the monitoring process by the monitoring thread CS are started at the same time, the starting of the processing is not limited to this. For example, it is also possible to start the monitoring thread CS after the image acquisition thread GS is started or to start the image acquisition thread GS after the monitoring thread CS is started.

In an actual process, the image acquisition thread GS issues a request for a first thumbnail image Simg1 to the personal computer 12 (step S3). If the thumbnail image Simg1 is acquired from the personal computer 12 (step S4), then the image acquisition thread GS now issues a request for a thumbnail image Simg2 to the personal computer 12 (Step S5). Thus, the image acquisition thread GS acquires the thumbnail image Simg2 from the personal computer 12 (step S6).

In the meantime, at the same time with the acquisition process of the thumbnail image Simg1, the monitoring thread CS starts a network check (state detection) process for detecting whether or not the network interface 34 itself of the audio apparatus 13 is functioning normally. Thereafter, the monitoring thread CS successively and periodically performs the processes at predetermined time intervals (step S7). Then, if it is confirmed that the network interface 34 is functioning normally, then the monitoring thread CS starts a next link check process.

Here, if it is decided that the network interface 34 is in a network error state that is not functioning normally by network check, then the monitoring thread CS outputs a trouble of the audio apparatus 13 itself as an error notification NG to the main thread MS (step S11). Consequently, the main thread MS outputs a temporarily stopping request STP1 to request the image acquisition thread GS to temporarily stop the acquisition request for thumbnail image data (step S12).

Consequently, the image acquisition thread GS can eliminate the waiting time until a result of the acquisition request is displayed on the LCD unit 30 after the acquisition request for thumbnail image data is transmitted to the personal computer 12. In this instance, such a massage "This machine fails to acquire the thumbnail image." is displayed to indicate that the thumbnail image data is not acquired successfully before lapse of a timeout period after the transmission of the acquisition request for thumbnail image data. Further, the image acquisition thread GS can cause the LCD unit 30 to immediately display such a network error notification screen NER1 as shown in FIG. 6 in response to the temporarily stopping request STP1 from the main thread MS.

Figure 6:
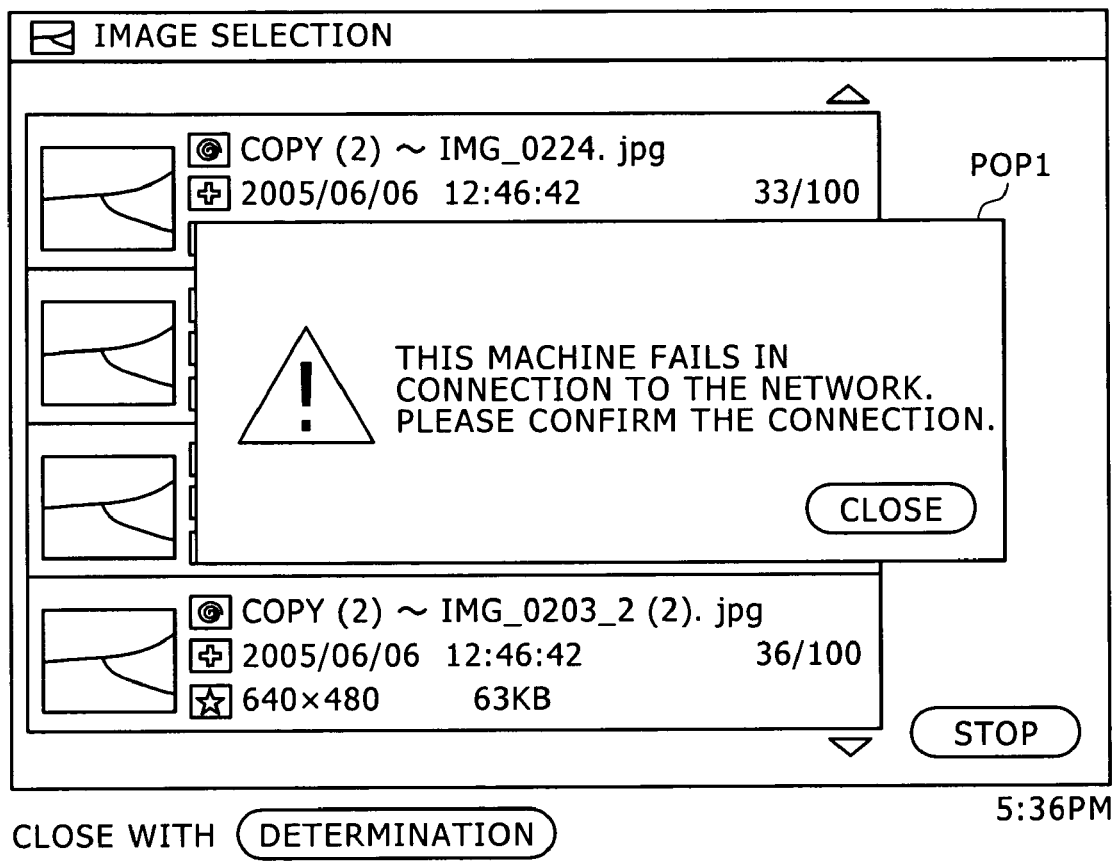
FIG. 6 is a schematic view showing a network error notification screen.

As seen in FIG. 6, a file name list of thumbnail image data acquired till then is displayed on the network error notification screen NER1. Further, a popup window screen POP1 on which a comment of "This machine fails in connection to the network. Please confirm the connection." is indicated is displayed on the network error notification screen NER1 in an overlapping relationship with the file name list. Consequently, the audio apparatus 13 can immediately notify the user that the thumbnail image data are not acquired successfully without causing the user to spend uselessness waiting time (for example, 75 to 80 seconds) until the timeout period elapses.

Referring back to FIG. 5, if it is confirmed from a result of execution of the network check process that the network interface 24 itself is functioning normally, then the monitoring thread CS performs a next link check process to confirm whether or not the LAN cable which should be connected to the network interface 34 of the audio apparatus 13 is not connected (step S8).

Here, if it is confirmed from a result of execution of the link check process that the audio apparatus 13 is in a link error state for example, the LAN cable is not connected the network interface 34 of the audio apparatus 13, then, also in this instance, the monitoring thread CS issues an error notification NG to the main thread MS (step S11). Consequently, the main thread MS transmits a temporarily stopping request STP1 to request the image acquisition thread GS to temporarily stop the acquisition request of the thumbnail image data (step S12).

Accordingly, similarly as in the case that the network interface 34 itself is not functioning normally, the image acquisition thread GS can cause the LCD unit 30 to immediately display such a network error notification screen NER1 as shown in FIG. 6 in response to the temporarily stopping request STP1 from the main thread MS without causing the user to spend uselessness time until the timeout period elapses after the acquisition request for thumbnail image data is outputted to the personal computer 12.

On the other hand, if it is confirmed from a result of execution of the link check process that the LAN cable is connected normally to the network interface 34 of the audio apparatus 13, then the monitoring thread CS accesses the personal computer 12 to request for issuance of a state notification of whether or not the audio apparatus 13 and the personal computer 12 are in a normal communication state (step S9).

Then, if a state notification is not received from the personal computer 12 even if a unique timeout period (for example, one second or the like) set in advance by the monitoring thread CS elapses (step S10), then the monitoring thread CS decides that, at the point of time, some error occurring with the personal computer 12 disables responding to the image acquisition request. Consequently, the monitoring thread CS issues an error notification NG to the main thread MS (step S11).

As a result, the main thread MS issues a temporarily stopping request STP1 to request the image acquisition thread GS to temporarily stop the acquisition request for thumbnail image data.

Figure 7:
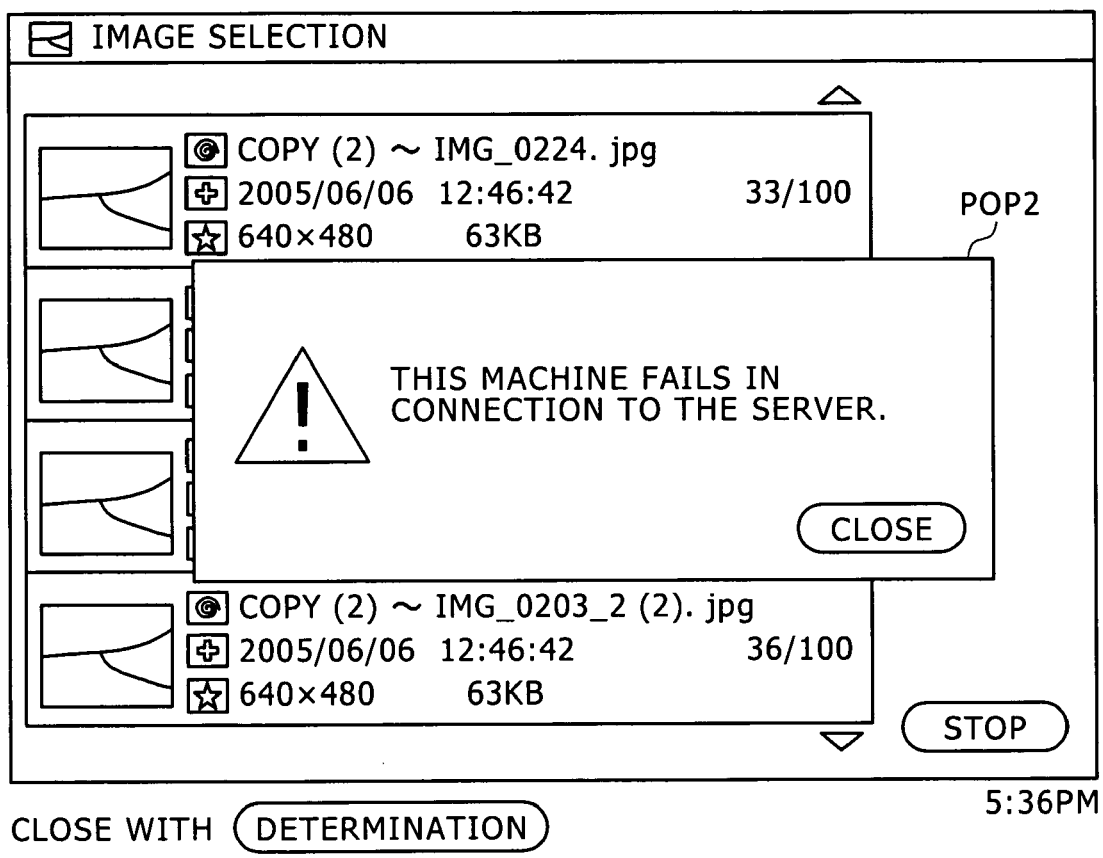
FIG. 7 is a schematic view showing a server connection error notification screen.

Accordingly, the image acquisition thread GS can cause the LCD unit 30 to immediately display such a server connection error notification screen SER1 as shown in FIG. 7 in response to the temporarily stopping request STP1 from the main thread MS without causing the user to spend uselessness time until the timeout period elapses after the acquisition request for thumbnail image data is outputted to the personal computer 12.

On the server connection error notification screen SER1, a popup window screen POP2 is displayed on which a comment of "This machine fails in connection to the server." is indicated in an overlapping relationship on the file name list of the thumbnail image data acquired till then, similarly as in the case of the network error notification screen NER1. Consequently, the audio apparatus 13 can notify the user immediately that thumbnail image data cannot be acquired without causing the user to spend uselessness waiting time until the timeout period elapses.

Also after then, the monitoring thread CS successively and periodically issues a request for a state notification of whether or not the personal computer 12 is operating normally (step S13). If a state notification is received from the personal computer 12 within a range of the timeout period (step S14), then the monitoring thread CS recognizes that the personal computer 12 is operating normally. Consequently, the monitoring thread CS issues a normal notification OK to the main thread MS (step S15).

Consequently, the main thread MS causes the LCD unit 30 to display such a normal state screen RS1 which do not include any of the popup windows POP1 and POP2 (FIG. 6 and FIG. 7) as seen in FIG. 8 in place of the server connection error notification screen SER1. Consequently, the user can visually confirm the fact that data communication can be performed normally between the audio apparatus 13 and personal computer 12.

Then, the main thread MS passes a changeover request CH for requesting for a next thumbnail image Simg3 in succession to the thumbnail image Simg2 acquired till now to the image acquisition thread GS (step S16).

Consequently, the image acquisition thread GS issues a request for the next thumbnail image Simg3 to the personal computer 12 based on the changeover request CH (step S17). Then, if the thumbnail image Simg3 is acquired from the personal computer 12 (step S18), then the image acquisition thread GS now issues a request for a thumbnail image Simg4 to the personal computer 12 (step S19). Consequently, the thumbnail image Simg4 is acquired from the personal computer 12 (step S20). Then, if such successive acquisition of thumbnail images Simg demanded by the user is completed, then the processing advances to an actual image data acquisition mode for acquiring actual image data corresponding to the thumbnail images Simg.

In the actual image data acquisition mode, the main thread MS first passes an image acquisition request IR for actual image data corresponding, for example, to the thumbnail image Simg1 selected by the user to the image acquisition thread GS (step S21). Consequently, the image acquisition thread GS receiving the image acquisition request IR issues a request for actual image data Rimg corresponding to the thumbnail image Simg1 to the personal computer 12 (step S22). As a result, the image acquisition thread GS acquires the actual image data Rimg from the personal computer 12 (step S23).

Consequently, the image acquisition thread GS passes a displaying request for the actual image data Rimg to the main thread MS (step S24). Consequently, the main thread MS causes the LCD unit 30 to display an image corresponding to the actual image data Rimg.

As a result, the series of processes from the thumbnail acquisition mode to actual image acquisition mode is completed. Therefore, the main thread MS passes a stopping instruction STP2 for stopping the image acquisition process to the image acquisition thread GS (step S25). At the same time, since there is no necessity to acquire an thumbnail image and an actual image from the personal computer 12 any more, the main thread MS passes also a stopping instruction STP3 for stopping the monitoring process to the monitoring thread CS (step S26). Consequently, all of the image acquisition process and the monitoring process are ended.

2-5. Action and Effects

The network state detection system 11 having the configuration described above includes the image acquisition processing system for acquiring thumbnail image data and actual image data from the personal computer 12 by means of the image acquisition thread GS of the audio apparatus 13. However, the network state detection system 11 further includes the monitoring processing system for detecting an abnormal state of the communication state between the audio apparatus 13 and the personal computer 12 by means of the monitoring thread CS independently of the image acquisition processing system.

Consequently, the audio apparatus 13 can execute state detection of the network interface 34 itself of the audio apparatus 13 at predetermined intervals and detect a communication disabled state with the personal computer 12 in response to a response to the state notification request to the personal computer 12.

Accordingly, the audio apparatus 13 can instantaneously detect both of a network error state or a link error state which originates from a trouble of the audio apparatus 13 itself and a communication disabled state with the personal computer 12 which originates from a trouble occurring outside the audio apparatus 13 itself without waiting for the timeout period (75 to 80 seconds) for the image acquisition. Besides, such instantaneous detection can be performed even after an acquisition request for thumbnail image data or actual image data is issued to the personal computer 12 and also even when the audio apparatus 13 is in a state that cannot acquire data from the personal computer 12. Further, the audio apparatus 13 can display the network error notification screen NER1 (in FIG. 6) or the server connection error notification screen SER1 (in FIG. 7) in response to the detected state on the LCD unit 40. Consequently, the user is permitted to visually confirm immediately that the audio apparatus 13 is in a state that cannot acquire data from the personal computer 12.

Also after then, the audio apparatus 13 acts to detect an abnormal communication state between the audio apparatus 13 and the personal computer 12 by means of the monitoring thread CS. Therefore, after the audio apparatus 13 detects that the communication state returns to a normal state, the normal state screen RS1 (in FIG. 8) is displayed on the LCD unit 40. Consequently, the user is permitted to visually confirm immediately that the state that data can be acquired is restored, and can cause the personal computer 12 to resume a next image acquisition process. Accordingly, smooth and efficient data acquisition can be achieved.

Further, when the monitoring thread CS decides based on a response to the state notification request from the personal computer 12 that an abnormal state occurs with the personal computer 12, the audio apparatus 13 issues an error notification to the main thread MS. Consequently, the main thread MS can control the network interface 34 to stop data transmission/reception (acquisition request for a thumbnail image or an actual image and reception of image data) to and from the personal computer 12 by the image acquisition thread GS. Accordingly, efficient data communication can be executed with useless traffic eliminated.

Thereafter, if it is detected by the monitoring thread CS based on a response to the state notification request from the personal computer 12 during stopping of data transmission/reception to and from the personal computer 12, that the communication state with the personal computer 12 is restored, then the audio apparatus 13 controls the network interface 34 so as to resume the data transmission/reception. Consequently, image data can be acquired from the personal computer 12 immediately when the communication state is restored.

In the network state detection system 11 having the configuration described above, the monitoring processing system for detecting an abnormal state of the communication state between the audio apparatus 13 and the personal computer 12 by means of the monitoring thread CS is provided independently of the image acquisition processing system for acquiring thumbnail image data and actual image data from the personal computer 12 by means of the image acquisition thread GS of the audio apparatus 13 as described above. Consequently, the audio apparatus 13 can immediately detect a trouble of the audio apparatus 13 itself as well as an abnormal state of the personal computer 12 of the connection destination. Thus, the communication state between the different network apparatus can be detected in a short period of time.

3. Other Embodiments

In the embodiment described above, when the audio apparatus 13 succeeds in the connection process to the personal computer 12, the monitoring process is started by the monitoring thread CS. However, according to an embodiment of the present invention, the starting of the monitoring process is not limited to this, but the monitoring process may otherwise be started simultaneously with the connection process or before the connection process.

In this instance, the audio apparatus 13 may demand considerable time for the connection process to the personal computer 12, and the monitoring process by which a network error state, a link error state or a communication disabled state with the different apparatus 2 is detected may possibly demand shorter time. In this instance, similarly as in the case that the connection process results in failure, the processing is ended without executing the sequence of the image acquisition process and the monitoring process.

Further, in the embodiment described hereinabove, when a state notification is not received from the personal computer 12 within a range of the timeout period, the monitoring thread CS decides that some trouble occurs with the personal computer 12 at the point of time and therefore the personal computer 12 cannot respond to the image acquisition request. Then, the monitoring thread CS passes an error notification NG to the main thread MS. However, according to an embodiment of the present invention, the passing of the error notification NG is not limited to this, but the error notification NG may be passed to the main thread MS also when a state notification indicative of an error is received from the personal computer 12.

Further, in the embodiment described hereinabove, when the image acquisition thread GS starts the image data acquisition process, the monitoring thread CS simultaneously and parallelly starts the monitoring process of the communication state with the personal computer 12. However, according to present invention, the starting of the monitoring process is not limited to this, but the monitoring thread CS may execute the monitoring process independently at a timing at which the image data acquisition process by the image acquisition thread GS is not proceeding.

Furthermore, in the embodiment described hereinabove, the present invention is applied to acquisition of a thumbnail image or an actual image from the personal computer 12 by the audio apparatus 13. However, the application of the present invention is not limited to this, but the present invention can be applied also to acquisition of a data file of MP3 compressed sound data, text data and so forth from the personal computer 12 by the audio apparatus 13.

Further, in the embodiment described hereinabove, the audio apparatus 13 and the personal computer 12 are connected to each other to construct a home network. However, according to an embodiment of the present invention, the connection is not limited to this, but the audio apparatus 13 and the personal computer 12 may be connected to each other through the Internet.

Furthermore, in the embodiment described hereinabove, the audio apparatus 13 which corresponds to the communication apparatus 1 (in FIG. 1) is composed from the network interface 34 acting as the network controller 3 (in FIG. 1) and the CPU 31 acting as the main controller 4 (in FIG. 1). However, according to an embodiment of the present invention, the configuration is not limited to this, but an audio apparatus or some other apparatus which corresponds to the communication apparatus 1 may be composed from the network controller 3 and the main controller 4 which have various other circuit configurations.

It should be understood by those skilled in the art that various modifications, combinations, sub-combinations and alterations may occur depending on design requirements and other factors insofar as they are within the scope of the appended claims or the equivalents thereof.

What is claimed is:

1. A communication apparatus comprising:
    a network controller configured to control communication connection to a different apparatus by generating a main thread to request connection to the different apparatus and an image acquisition thread to issue an image request to the different apparatus, and
    a main controller configured to
        control state detection of said network controller and data communication with the different apparatus connected to said communication apparatus through said network controller once the main thread confirms that the connection request with the different apparatus has been successful,
        generate a monitoring thread that determines whether the network controller is operative, and in response to the network controller being operative, determines whether the network controller is connected to a local area network, and in response to the network controller being connected to the local area network, the monitoring thread periodically issues, at predetermined intervals, state notification requests to the different apparatus, while said image acquisition thread requests a thumbnail image of an actual image from the different apparatus and said thumbnail image request is still pending,
        detect a communication disabled state at the different apparatus when no state notification from the different apparatus is received within a predetermined time period, and
        issue a stop request to the network controller so that the thumbnail image request is stopped, upon detection of the communication disabled state.

2. The communication apparatus according to claim 1, wherein said main controller is configured to control said network controller to perform data transmission and reception to and from the different apparatus separately from the transmission of the state notification request.

3. The communication apparatus according to claim 2, wherein the communication disabled state is detected from the different apparatus, said main controller issues an error notification.

4. The communication apparatus according to claim 3, wherein said main controller controls said network controller to continue to transmit the state notification request to the different apparatus at the predetermined intervals also while the thumbnail image request is stopped, and in a case a normal response is detected again from the different apparatus, said network controller is configured to re-start the thumbnail image request.

5. The communication apparatus according to claim 1, further comprising:
    a display unit, wherein
    said main controller further configured to temporarily stop the data transmission request of the network controller, and configured to display a network error notification message on the display unit.

6. The communication apparatus according to claim 1, wherein upon reception of the thumbnail image by the network controller, the image acquisition thread generated by the network controller issues a request to the different apparatus to acquire the actual image corresponding to the received thumbnail image.

7. A communication method performed on a communication apparatus having a network controller controlling communication between the communication apparatus and a different apparatus, and a main controller for detecting the operational state of the network controller and the different apparatus, the method comprising:
    requesting connection to the different apparatus by a main thread that is operating on the network controller;
    issuing an image acquisition thread that requests a thumbnail image of an actual image by the network controller to the different apparatus, once the main thread confirms that the connection request with the different apparatus has been successful;
    generating, by the main controller, a monitoring thread that determines whether the network controller is operative, and in response to the network controller being operative, determines whether the network controller is connected to a local area network, and in response to the network controller being connected to the local area network, the monitoring thread periodically issues state notification requests at predetermined intervals by the main controller to the different apparatus, while said thumbnail image request of said step of issuing is still pending;
    detecting a communication disabled state at the different apparatus with the main controller, when no state notification from the different apparatus is received within a predetermined period of time; and
    issuing a stop request from the main controller to the network controller so that the thumbnail image request is stopped, upon detection of the communication disabled state at the main controller.

8. The communication method according to claim 7, the communication apparatus further having a display unit, the method further comprising the steps of:
    temporarily stopping the data transmission request of the network controller by said main controller; and
    displaying a network error notification message on the display unit.

9. The communication method according to claim 7, further comprising the step of:
    issuing a request to the different apparatus to acquire the actual image corresponding to the received thumbnail image by the image acquisition thread generated by the network controller, upon reception of the thumbnail image by the network controller.

10. A computer readable memory device, having program code stored thereon, the program code configured to perform a communication method performed on a communication apparatus when executed on the communication apparatus, the apparatus having a network controller controlling communication between the communication apparatus and a different apparatus, and a main controller for detecting the operational state of the network controller and the different apparatus, the method comprising:

requesting connection to the different apparatus by a main thread that is operating on the network controller;

issuing an image acquisition thread that requests a thumbnail image of an actual image by the network controller to the different apparatus, once the main thread confirms that the connection request with the different apparatus has been successful;

generating, by the main controller, a monitoring thread that determines whether the network controller is operative, and in response to the network controller being operative, determines whether the network controller is connected to a local area network, and in response to the network controller being connected to the local area network, the monitoring thread periodically issues state notification requests at predetermined intervals by the main controller to the different apparatus, while said thumbnail image request of said step of issuing is still pending;

detecting a communication disabled state at the different apparatus with the main controller, when no state notification from the different apparatus is received within a predetermined period of time; and issuing a stop request from the main controller to the network controller so that the thumbnail image request is stopped, upon detection of the communication disabled state at the main controller.

11. The computer readable memory device according to claim 10, the communication apparatus further having a display unit, said method further comprising the steps of:

temporarily stopping the data transmission request of the network controller by said main controller; and displaying a network error notification message on the display unit.

12. The computer readable memory device according to claim 10, said method further comprising the step of:

issuing a request to the different apparatus to acquire the actual image corresponding to the received thumbnail image by the image acquisition thread generated by the network controller, upon reception of the thumbnail image by the network controller.

* * * * *